(12) United States Patent
Schuermann et al.

(10) Patent No.: US 10,787,044 B2
(45) Date of Patent: Sep. 29, 2020

(54) PNEUMATIC VEHICLE TIRE

(71) Applicant: Continental Reifen Deutschland GmbH, Hannover (DE)

(72) Inventors: Oliver Schuermann, Langenhagen (DE); Andreas Tyburski, Ilsede (DE); Annalena Thiemann, Sehnde (DE)

(73) Assignee: Continental Reifen Deutschland GmbH, Hannover (DE)

( * ) Notice: Subject to any disclaimer, the term of this patent is extended or adjusted under 35 U.S.C. 154(b) by 315 days.

(21) Appl. No.: 15/873,621

(22) Filed: Jan. 17, 2018

(65) Prior Publication Data

US 2018/0141392 A1 May 24, 2018

Related U.S. Application Data

(63) Continuation of application No. PCT/EP2016/054721, filed on Mar. 7, 2016.

(30) Foreign Application Priority Data

Jul. 17, 2015 (DE) .................. 10 2015 213 496

(51) Int. Cl.
*B60C 19/00* (2006.01)
*B60C 17/00* (2006.01)

(52) U.S. Cl.
CPC ........ *B60C 19/002* (2013.01); *B60C 17/0009* (2013.01)

(58) Field of Classification Search
CPC .................................................. B60C 19/002
See application file for complete search history.

(56) References Cited

U.S. PATENT DOCUMENTS

2006/0086465 A1* 4/2006 Munroe ................ B60C 25/147
157/1
2007/0137752 A1* 6/2007 Agostini .................. B60C 5/14
152/450
(Continued)

FOREIGN PATENT DOCUMENTS

DE 198 06 935 C2 9/1999
DE 102007028932 A1 12/2008
(Continued)

OTHER PUBLICATIONS

International Search Report dated May 10, 2016 of international application PCT/EP2016/054721 on which this application is based.

*Primary Examiner* — Jacob T Minskey
*Assistant Examiner* — Melody Tsui
(74) *Attorney, Agent, or Firm* — David L. Cate; Gregory Adams

(57) ABSTRACT

A pneumatic vehicle tire has a structured tread which transitions at both sides into sidewalls the end of which is formed by a tire bead which is insertable in air-tight fashion into a wheel rim of a vehicle wheel equipped with the pneumatic vehicle tire, such that an air cavity filled with compressed air is formed between wheel rim and pneumatic vehicle tire. The pneumatic vehicle tire has, on its inner surface situated opposite the tread, a foamed material layer. The porosity of the foamed material layer amounts to between 70% and 99% of the total volume of the foamed material layer.

7 Claims, 1 Drawing Sheet

(56) References Cited

U.S. PATENT DOCUMENTS

| | | | | |
|---|---|---|---|---|
| 2009/0277553 A1* | 11/2009 | Tanno | .................. | B60C 19/002 |
| | | | | 152/503 |
| 2013/0048181 A1* | 2/2013 | Benoit | ................. | B60C 19/002 |
| | | | | 152/450 |
| 2016/0121648 A1* | 5/2016 | Parrett | ................... | B60B 21/12 |
| | | | | 301/64.101 |

FOREIGN PATENT DOCUMENTS

| | | |
|---|---|---|
| EP | 0364927 A2 | 4/1990 |
| JP | 2002178712 A | 6/2002 |
| JP | 2005104314 A | 4/2005 |
| JP | 2008162496 A | 7/2008 |

\* cited by examiner

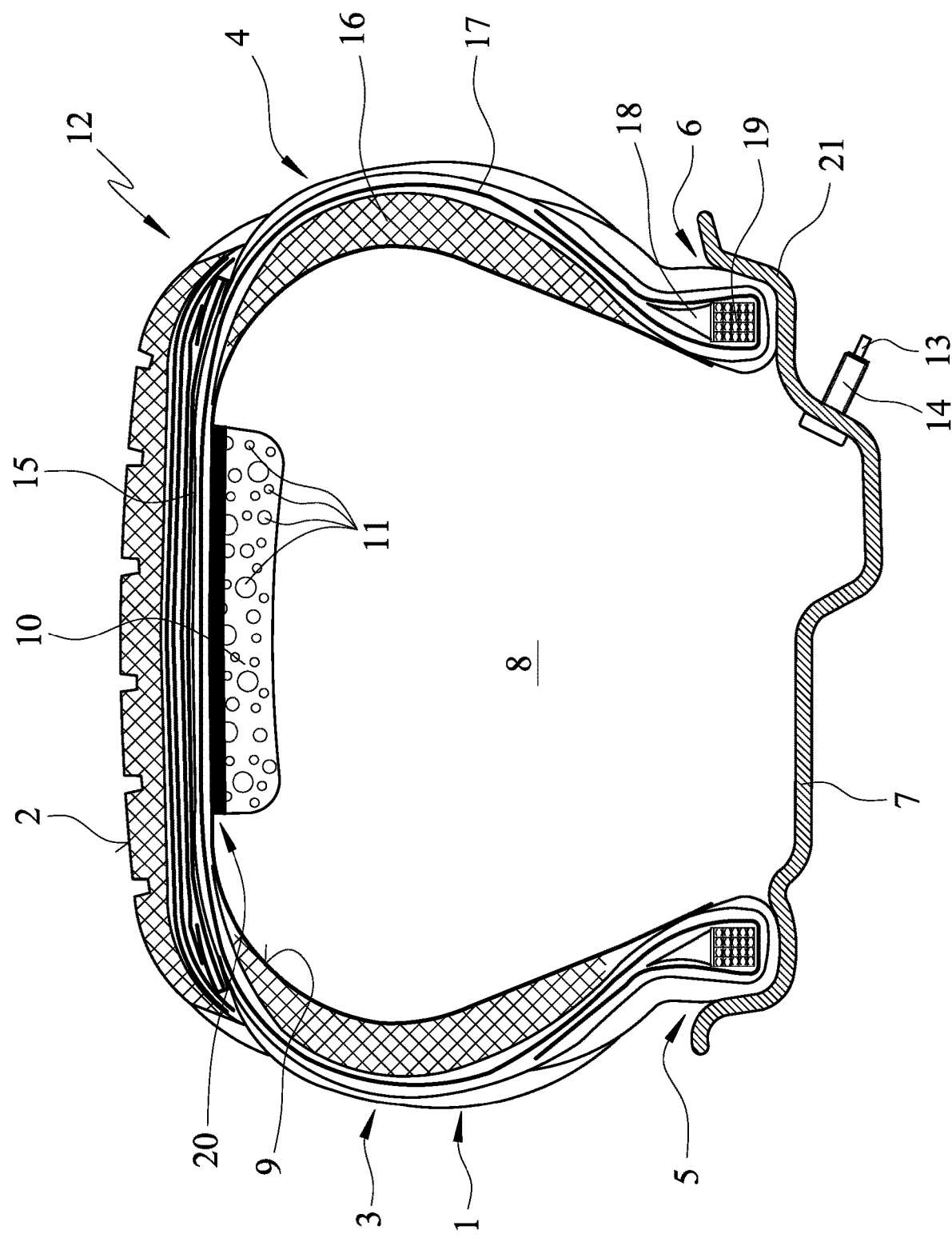

PNEUMATIC VEHICLE TIRE

CROSS REFERENCE TO RELATED APPLICATIONS

This application is a continuation application of international patent application PCT/EP2016/054721, filed Mar. 7, 2016 designating the United States and claiming priority from German application 10 2015 213 496.2, filed Jul. 17, 2015 and the entire content of both applications is incorporated herein by reference.

BACKGROUND OF THE INVENTION

Pneumatic vehicle tires of the type in question here may be used for two-wheeled vehicles and for passenger motor vehicles, agricultural vehicles and/or heavy goods vehicles. The common feature of the pneumatic vehicle tires consists in that they have a structured tread, the structure of which is suitably adapted to the underlying surfaces and weather conditions to be expected. In a manner known per se, the tread of the pneumatic vehicle tire transitions at both sides into sidewalls, the end of which is formed in each case by a tire bead. The tire bead serves for the air-tight fixing of that part of the pneumatic vehicle tire which is made up of different rubber mixtures to a wheel rim of a vehicle wheel equipped with the pneumatic vehicle tire. Here, in a manner which is likewise known, the vehicle wheel rim has, correspondingly to the tire bead, a wheel-rim edge against which the tire bead sealingly bears when the tubeless pneumatic vehicle tire is filled with compressed air. The pneumatic vehicle tire consequently has an air cavity in which a foamed material layer made of polyurethane or polyethylene is present, which is fastened to the inner surface situated opposite the tread of the pneumatic vehicle tire.

Pneumatic vehicle tires must nowadays not only transmit the kinetic energy generated by the motor vehicle to the underlying surface in an optimum manner at all times under changing environmental conditions, but must increasingly also satisfy elevated demands with regard to comfort. Here, the rolling noise of the pneumatic vehicle tire also plays a significant role, which noise is generated by the vibration of the air when the latter is compressed as the pneumatic vehicle tire is pressed against the road surface. The rolling noise is transmitted from the pneumatic vehicle tire to the wheel hub before possibly passing via the steering system and the suspension arrangement into the passenger compartment. Exposure to the rolling noise generated during driving is perceived as disturbing not only within but also outside the motor vehicle, which is of increasing significance for example in cities.

The rolling noise can be significantly reduced by means of technology which is already known and which is already in use in some motor vehicles. Here, a foamed material is used which is arranged in the pneumatic vehicle tire and which is commonly referred to as "absorber", and which is attached by means of an adhesive to the inner surface of the tread. The structure of this foamed material, which is generally made of foamed polyurethane (PU) or polyethylene (PE), is maintained even in the event of extreme temperature fluctuations. Polyurethanes are plastics or synthetic resins which form from the polyaddition reaction of dialcohols or polyols with polyisocyanates. Depending on the type of motor vehicle, the speed thereof and the road surface, it is presently possible by means of the stated sound reduction measures to achieve reductions in vehicle noise in the interior compartment of the motor vehicle of up to 9 dB(A), wherein neither the travelling characteristics nor the range, the load capacity or the speed achievable with the pneumatic vehicle tire is restricted as a result of the introduction of the foamed material into the pneumatic vehicle tire.

Such a pneumatic vehicle tire is known for example from DE 10 2007 028 932 A1. The document describes that the foamed material layer within the pneumatic vehicle tire is adhesively fastened, by means of a pre-applied, self-sealing sealant, to the inner surface of the pneumatic vehicle tire. As sealant, use is made here of a polyurethane gel.

Furthermore, DE 198 06 935 C2 has disclosed a pneumatic vehicle tire and a method for producing a pneumatic vehicle tire of this type, in the case of which the foamed material layer is, even before being applied to the inner surface of the pneumatic vehicle tire, produced in a shape suitable for this purpose by means of a foaming process and subsequently equipped, on the side facing toward the interior space of the pneumatic vehicle tire, with an additional, sound-absorbing structure. The structure applied to the foamed material layer may in this case have a linear shape or an undulating shape, which are each suitable for realizing an enlarged surface, which additionally has a sound-absorbing action.

As has already been stated above, very good sound absorption of the rolling noise generated by the pneumatic vehicle tire can already be achieved with the solutions already known. There is nevertheless a demand for a further improvement.

SUMMARY OF THE INVENTION

It is an object of the invention to provide a pneumatic vehicle tire which is equipped with an internally situated foamed material layer, the acoustic absorption capability of which is improved in relation to known solutions.

This object can, for example, be achieved via a pneumatic vehicle tire having a structured tread which transitions at both sides into sidewalls, the end of which is formed by a tire bead which is insertable in air-tight fashion into a wheel rim of a vehicle wheel equipped with the pneumatic vehicle tire, such that an air cavity filled with compressed air is formed between wheel rim and pneumatic vehicle tire, wherein the pneumatic vehicle tire has, on its inner surface situated opposite the tread, a foamed material layer, has been refined according to an aspect of the invention such that the porosity of the foamed material layer amounts to between 80% and 99% of the total volume of the foamed material layer.

The characteristics of the foamed material layer are achieved exclusively through the process control during the foaming process, wherein the foam is foamed from the liquid phase. Practically no further processing of the foamed material layer is performed thereafter. The raw materials, the temperature, the gas formation, the foaming rate and external conditions, such as the counterpressure and the foaming mold used, in which the foaming process is performed, form significant boundary conditions for the quality of the foamed material. The geometry (pore size and shape as well as thickness and stiffness of the cell walls) and thus ultimately characteristics such as weight, sound absorption, pressure deformation and the thermal insulation of the foamed material layer also consequently result from this.

It has been possible to identify that, with the characteristic of the foamed material layer whereby the porosity amounts to between 70% and 99% of the total volume of the foamed material layer, it is possible to achieve further significantly improved sound absorption characteristics in relation to foamed material layers already used in pneumatic vehicle tires. This substantial improvement results from the relatively high proportion of air in the foamed material layer. The pores containing the air reflect and break up the body-borne sound and thus the rolling noise of the pneumatic vehicle tire, such that the stated effect arises.

A first embodiment of the invention is characterized in that 40% of the pores present in the foamed material layer have a size between 0.3 mm and 0.4 mm, 40% of the pores present in the foamed material layer have a size between 0.4 mm and 0.5 mm, 10% of the pores present in the foamed material layer have a size between 0.5 mm and 0.7 mm, 8% of the pores present in the foamed material layer have a size smaller than 0.3 mm, and 2% of the pores present in the foamed material layer have a size greater than 0.7 mm. Thus, a total of approximately 80% of the pores lie in a size range between 0.3 and 0.5 mm, and are thus definitive for the positive result of an embodiment according to the invention.

Furthermore, in an embodiment of the invention individual pores in the foamed material layer have a size from 1.0 mm to 1.5 mm. In other words, only relatively few pores are of such a size, which has the effect that the foamed material layer is overall of relatively fine-pored design, and has a high proportion of air. The characteristics of improved sound absorption as mentioned in the introduction can thus be achieved.

Particularly good results of the absorption of the rolling noise of the pneumatic vehicle tire can furthermore be achieved if the geometry of the pores in the foamed material layer is spherical or polygonal. In the case of a polygonal geometry of the pores of the foamed material layer, geometries of the pores which are hexagonal in cross section are particularly preferred, wherein pores which are of tetragonal design in cross section also fall within the invention, however. The hexagonal geometry of the pores arises as a result of the number of adjacent pores and the surface tension of the cell walls, and also as a result of the basic stiffness of the material used for producing the foamed material layer.

Improvements with regard to the sound absorption of the foamed material layer can furthermore be achieved if, in a plane, between 5 and 12, and in space, up to 26, pores are arranged adjacent to one another, which is an effect of the distribution of the pore size and/or of the variation thereof. For example, a large pore may thus be surrounded by several relatively small pores. If all pores are of equal size, the number of adjacent pores is defined. In the case of a cubic pore shape, there are for example 6 first-degree neighbours with areal contact and 20 second-degree neighbours with linear contact. In the case of spherical pores, in three-dimensional space, there are 6 or 8 neighbouring pores depending on packing density.

Furthermore, in an advantageous embodiment of the invention, the foamed material layer that is used has the characteristic whereby the cell walls of the pores in the foamed material layer are of rod-like form with a branching density of between 3 and 15, preferably 7, branches per junction point. It is consequently possible, in accordance with this proposal, for the cell walls to have special geometric shapes. Here, the pores must fill the remaining space with entirely random shapes. Here, a dependency can be identified between the stiffness, the surface tension and the molecular structure of the cell walls with the pressure in the pores that arises during the foaming process. The number and arrangement of the branches and branching points is achieved by means of the interaction of stiffness, surface tension and molecular structure of the branches with the pressure and the distribution of the pores during the foaming process.

BRIEF DESCRIPTION OF THE DRAWING

The invention will now be described with reference to the single FIGURE of the drawing (FIG. 1) which shows a cross section through a vehicle wheel.

DESCRIPTION OF THE PREFERRED EMBODIMENTS OF THE INVENTION

Here, the embodiment shown does not represent a restriction to the illustrated variant, but rather serves merely for the explanation of a principle of the invention.

Identical or similar components are always denoted by the same reference designations. To be able to illustrate the function, the FIGURE shows only highly simplified diagrammatic illustrations, in which components not essential to the invention have been omitted. This however does not mean that such components are not present in a solution according to the invention.

FIG. 1 shows a cross section through a vehicle wheel 12. The latter is made up of a pneumatic vehicle tire 1 and a wheel rim 7 which holds the pneumatic vehicle tire 1. The pneumatic vehicle tire 1 itself includes a profiled tread 2, the profile of which is merely indicated in the illustration in FIG. 1 by multiple groove-like depressions. Below the tread 2, the pneumatic vehicle tire 1 has multiple belt plies 15 which, in FIG. 1, are likewise illustrated merely by way of indication. To both sides of the tread 2, the pneumatic vehicle tire 1 furthermore transitions into in each case one sidewall 3 and 4 respectively, the lower end of which is formed in each case by a tire bead 5 and 6 respectively. Each tire bead 5, 6 includes a bead core 19, which transitions into a core profile 18 which is encased with a rubber material. The tire beads 5, 6 of the pneumatic vehicle tire 1 form a seal with respect to the surroundings, such that the tire beads 5, 6 bear in air-tight fashion against a wheel-rim edge 21 of the wheel rim 7. The pneumatic vehicle tire 1 and the wheel rim 7 thus jointly surround an air cavity 8, which is filled with compressed air via the valve 13, inserted into a valve shank 14, of the vehicle wheel 12. The sidewalls 3, 4 of the pneumatic vehicle tire 1 are, in a manner known per se, made up of multiple plies, and thus form a complex system for stabilizing the pneumatic vehicle tire 1. Thus, on the inner surface of each sidewall 3, 4, there is firstly a reinforcement profile 16 present, which is adjoined in the direction of the outer side of each sidewall 3, 4 by a carcass 17, which in turn is embedded into a rubber layer that is not designated in any more detail in FIG. 1. Furthermore, the sidewall may include additional individual plies, which will however not be discussed in any more detail here.

FIG. 1 shows a foamed material layer 10 arranged on the inner surface 9, which is situated opposite the tread 2, of the pneumatic vehicle tire 1. The foamed material layer 10 is cohesively connected to the inner surface 9 of the pneumatic vehicle tire 1 using an adhesive 20. As emerges by way of indication from the illustration in FIG. 1, the adhesive 20 is in the present case applied areally in continuous fashion and, in the example, is applied to the inner surface 9 of the pneumatic vehicle tire 1 in a circumferential direction of the pneumatic vehicle tire 1. The foamed material layer 10 has subsequently been connected to the inner surface 9 of the pneumatic vehicle tire 1. In this example, it is significant to note that the porosity of the foamed material layer 10 amounts to between 80% and 99% of the total volume of the foamed material layer 10. In FIG. 1, this is symbolized by the large number of pores 11 in the foamed material layer 10. Furthermore, the solution according to the invention has different sizes of the pores 11. Accordingly, in the illustration, pores 11 with a relatively large diameter and pores 11 with a relatively small diameter are thus indicated. Here, the foamed material layer 10 has the special feature whereby 40% of the pores 11 present in the foamed material layer 10 have a size between 0.3 mm and 0.4 mm, 40% of the pores 11 present in the foamed material layer 10 have a size between 0.4 mm and 0.5 mm, 10% of the pores 11 present in the foamed material layer 10 have a size between 0.5 mm and 0.7 mm, 8% of the pores 11 present in the foamed material layer 10 have a size smaller than 0.3 mm, and 2% of the pores 11 present in the foamed material layer 10 have a size greater than 0.7 mm. Here, the pores 11 shown in FIG. 1 have, without exception, a spherical geometry.

It is understood that the foregoing description is that of the preferred embodiments of the invention and that various changes and modifications may be made thereto without departing from the spirit and scope of the invention as defined in the appended claims.

LIST OF REFERENCE DESIGNATIONS

1 Pneumatic vehicle tire
2 Tread
3 Sidewall
4 Sidewall
5 Tire bead
6 Tire bead
7 Wheel rim
8 Air cavity
9 Inner surface
10 Foamed material layer
11 Pore
12 Vehicle wheel
13 Valve
14 Valve shank
15 Belt plies
16 Reinforcing profile
17 Carcass
18 Core profile
19 Bead core
20 Adhesive

What is claimed is:

1. A pneumatic vehicle tire comprising:
a first sidewall including a first tire bead forming a first sidewall end;
a second sidewall including a second tire bead forming a second sidewall end;
a structured tread which transitions at both sides into respective ones of said first sidewall and said second sidewall;
said first tire bead and said second tire bead being configured to be inserted in an air-tight manner into a wheel rim of a vehicle wheel equipped with the pneumatic vehicle tire such that an air cavity filled with compressed air is formed between the wheel rim and the pneumatic vehicle tire;
the pneumatic vehicle tire having an inner surface disposed opposite said tread;
a foamed material layer disposed on said inner surface;
said foamed material layer having a plurality of pores defining a porosity of between 70% and 99% of the total volume of said foamed material layer; and,
wherein 40% of said pores in said foamed material layer have a size between 0.3 mm and 0.4 mm, 40% of said pores in said foamed material layer have a size between 0.4 mm and 0.5 mm, 10% of said pores in said foamed material layer have a size between 0.5 mm and 0.7 mm, 8% of said pores in said foamed material layer have a size smaller than 0.3 mm, and 2% of said pores in said foamed material layer have a size greater than 0.7 mm.

2. The pneumatic vehicle tire of claim 1, wherein individual ones of said pores in said foamed material layer have a size lying in a range from 1.0 mm to 1.5 mm.

3. The pneumatic vehicle tire of claim 1, wherein said pores in said foamed material layer have a spherical or polygonal geometry.

4. The pneumatic vehicle tire of claim 1, wherein said pores in said foamed material layer have a tetragonal or hexagonal geometry when viewed in cross section.

5. The pneumatic vehicle tire of claim 1, wherein in a plane, between five and twelve, and in space, up to twenty-six, pores are arranged adjacent to one another.

6. The pneumatic vehicle tire of claim 1, wherein said pores in said foamed material layer each have cell walls having a rod-like form with a branching density between three and fifteen branches per junction point.

7. The pneumatic vehicle tire of claim 1, wherein said pores in said foamed material layer each have cell walls having a rod-like form with a branching density of seven branches per junction point.

* * * * *